May 4, 1943.  I. I. SIKORSKY  2,318,259
DIRECT-LIFT AIRCRAFT
Filed April 6, 1940     10 Sheets-Sheet 1

INVENTOR
*Igor I. Sikorsky*
BY
*Harris G. Luther*
ATTORNEY

May 4, 1943.  I. I. SIKORSKY  2,318,259
DIRECT-LIFT AIRCRAFT
Filed April 6, 1940  10 Sheets-Sheet 2

INVENTOR
Igor I. Sikorsky
BY Harris G. Luther
ATTORNEY

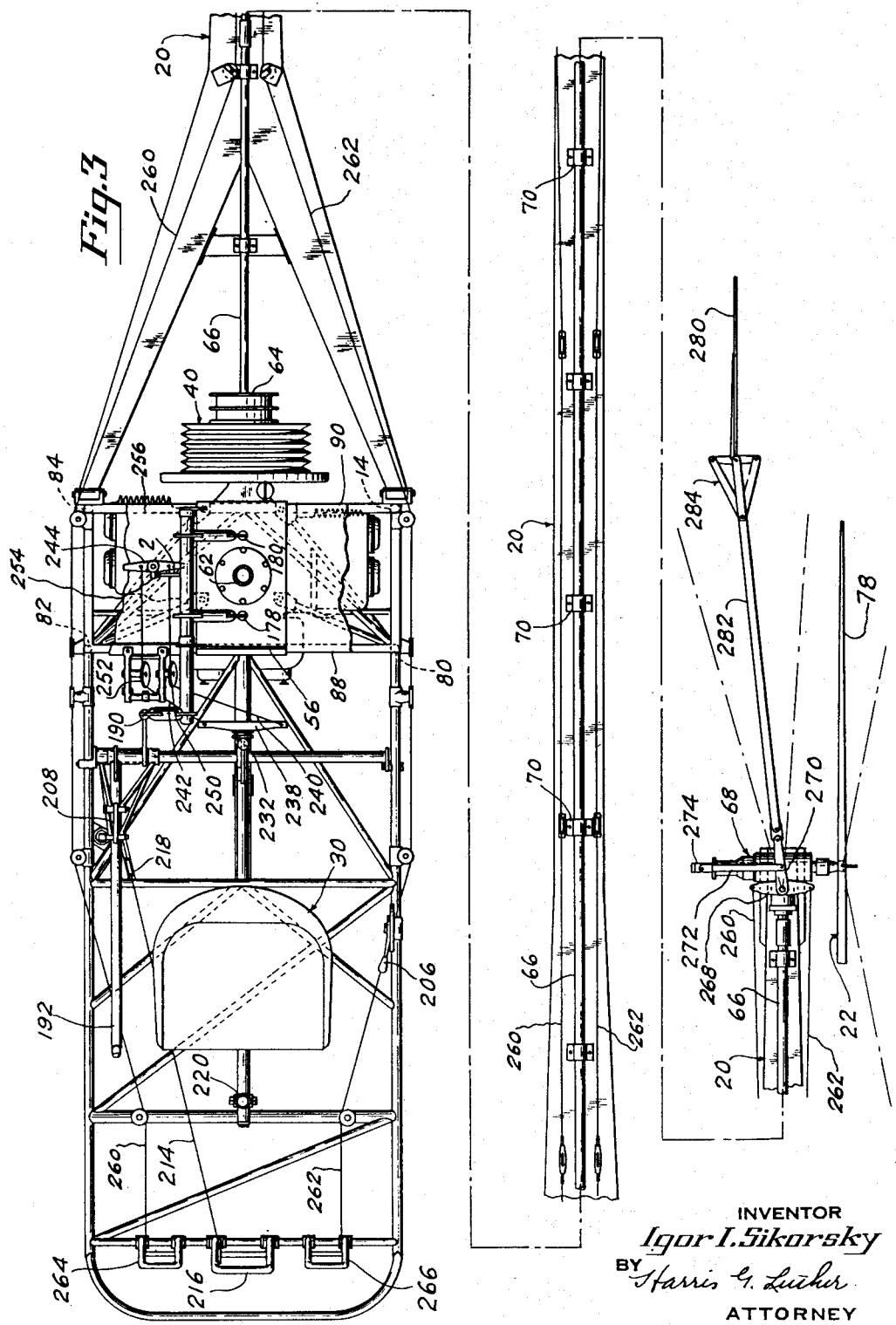

May 4, 1943.　　　I. I. SIKORSKY　　　2,318,259
DIRECT-LIFT AIRCRAFT
Filed April 6, 1940　　　10 Sheets-Sheet 4
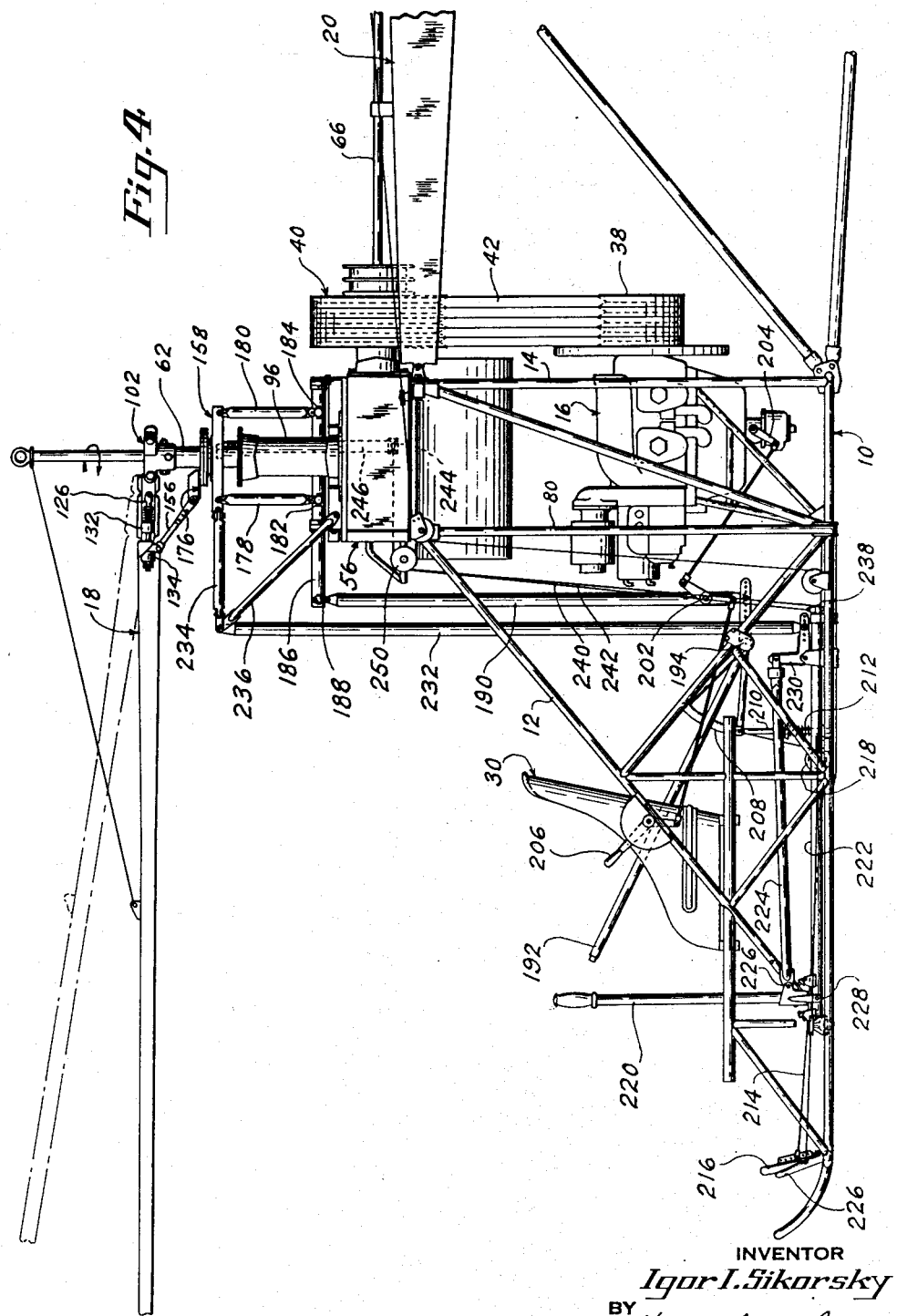
INVENTOR
*Igor I. Sikorsky*
BY
*Harris G. Luther*
ATTORNEY

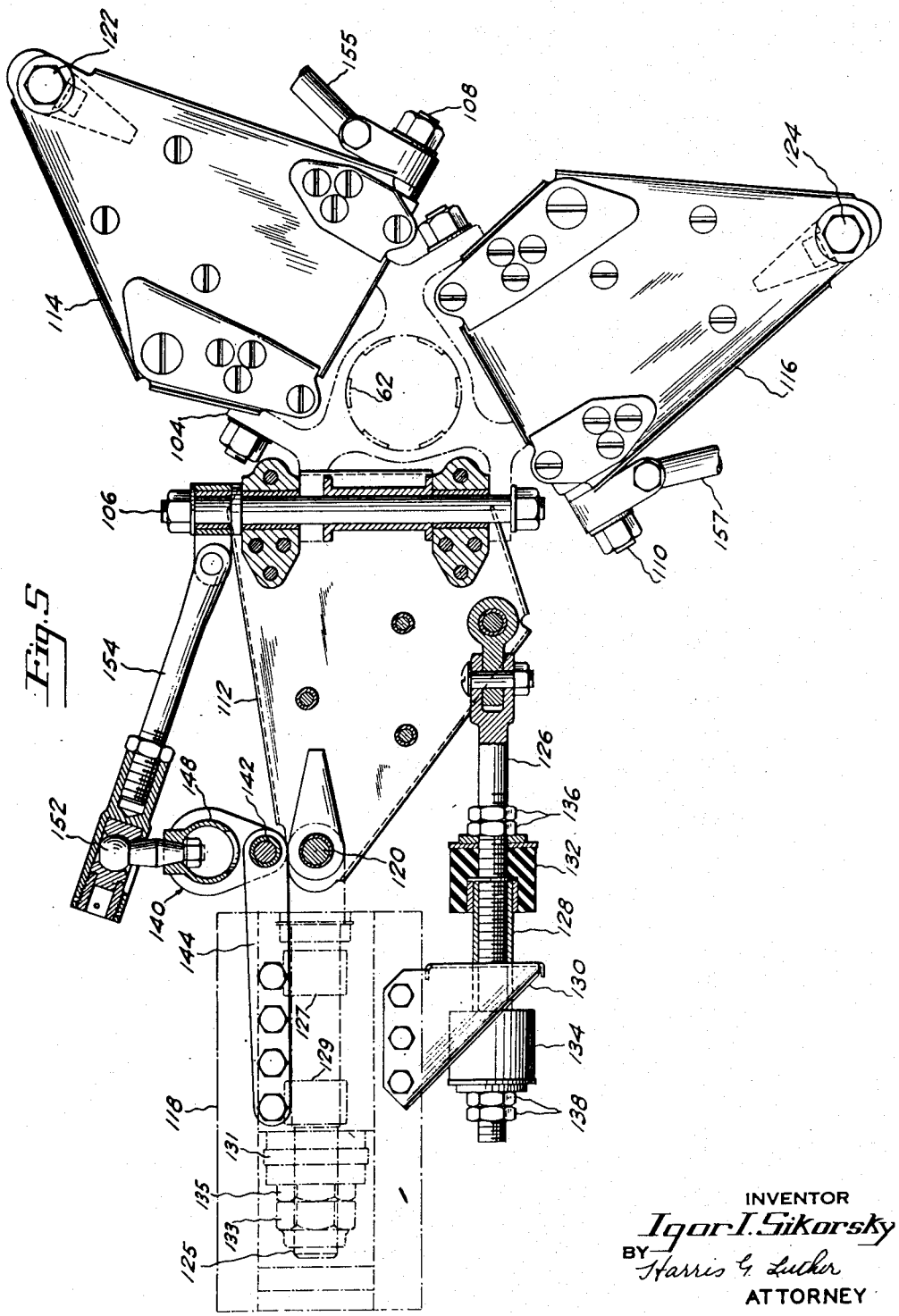

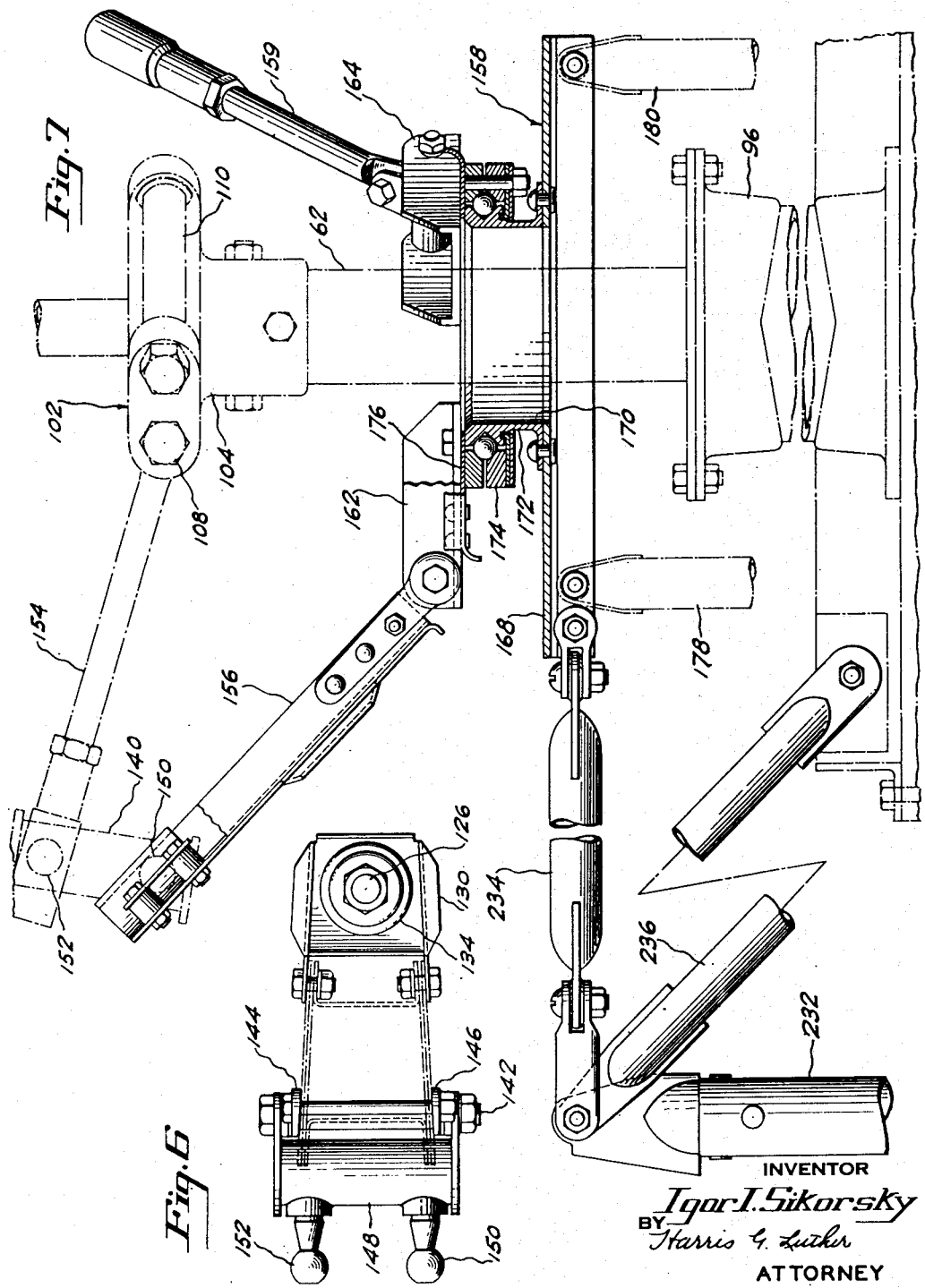

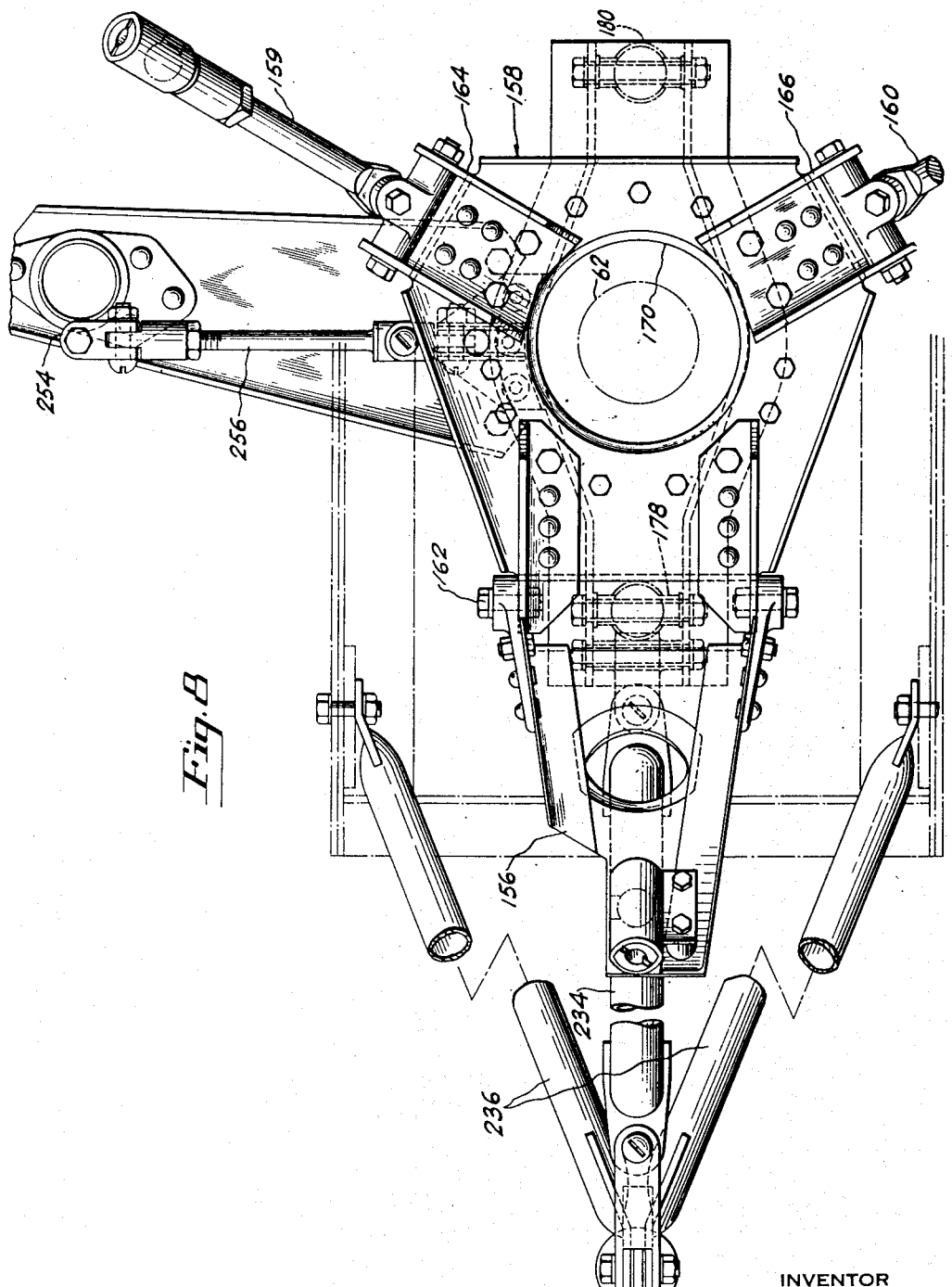

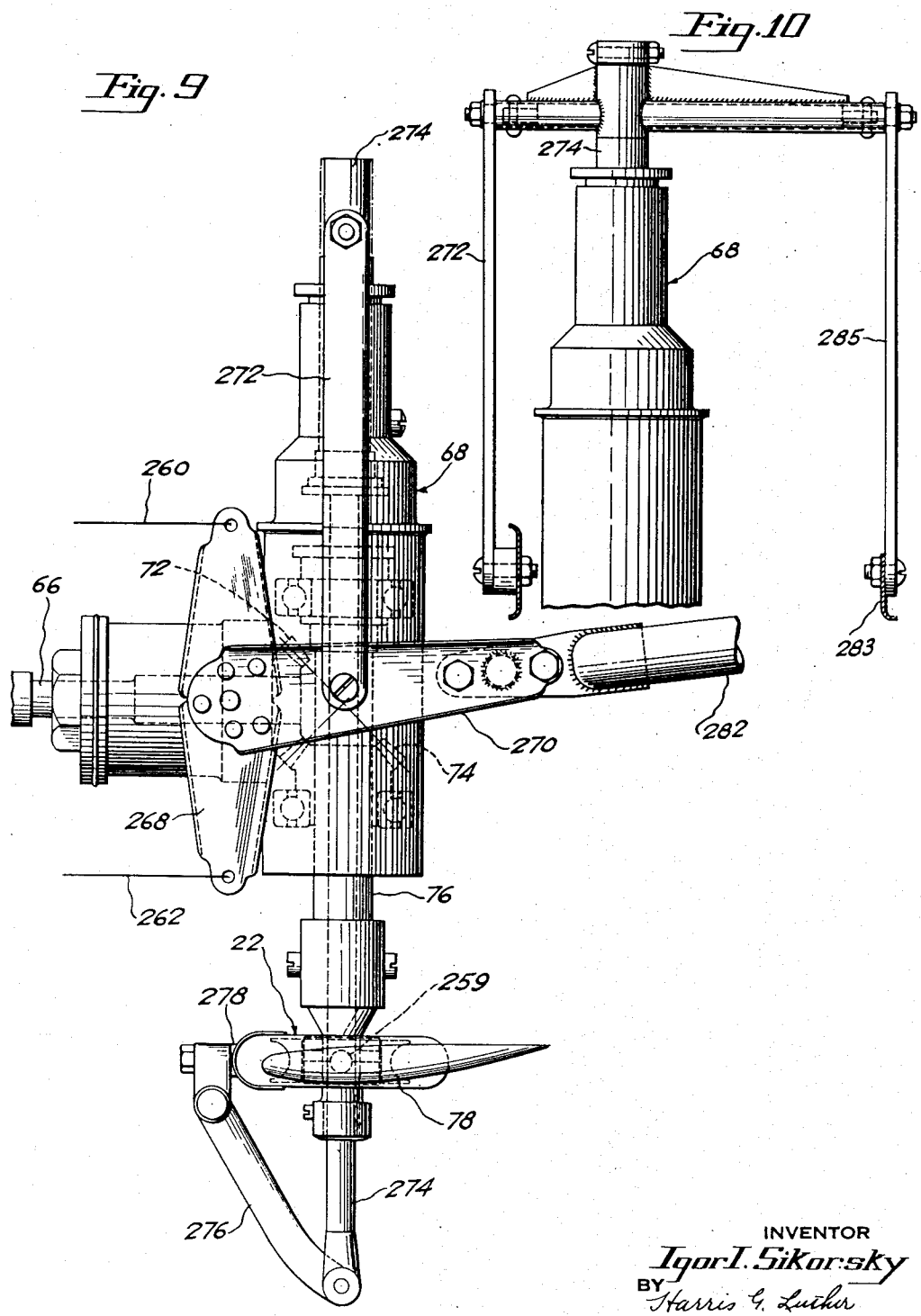

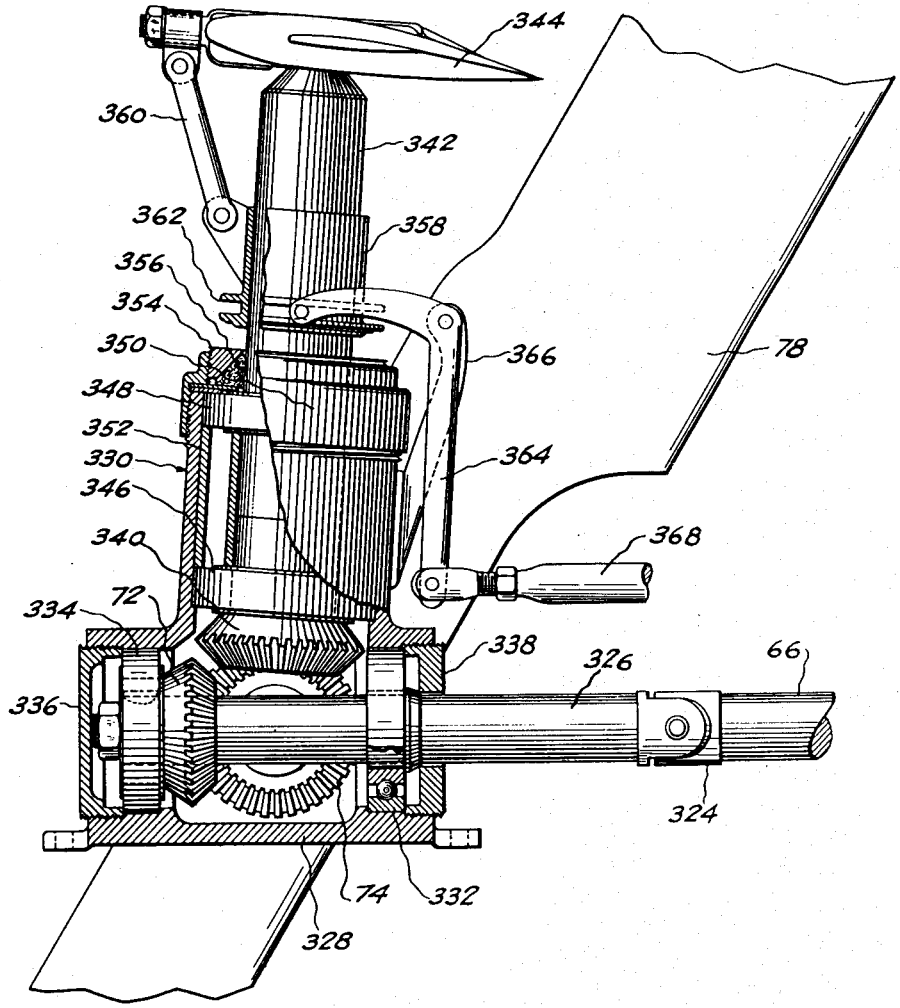

May 4, 1943.　　　I. I. SIKORSKY　　　2,318,259
DIRECT-LIFT AIRCRAFT
Filed April 6, 1940　　　10 Sheets-Sheet 10

INVENTOR
*Igor I. Sikorsky*
BY *Harris G. Luther*
ATTORNEY

Patented May 4, 1943

2,318,259

UNITED STATES PATENT OFFICE 2,318,259

DIRECT-LIFT AIRCRAFT

Igor I. Sikorsky, Trumbull, Conn., assignor to United Aircraft Corporation, East Hartford, Conn., a corporation of Delaware Application April 6, 1940, Serial No. 328,225

10 Claims. (Cl. 244—17)

This invention relates to improvements in aircraft and has particular reference to improvements in direct lift type of aircraft commonly referred to as helicopters.

An object of the invention resides in the provision of an improved direct lift type aircraft of the character indicated, having an engine, or engines, a main rotor and auxiliary rotors or propellers with a positive driving connection between the main rotor and the auxiliary rotors and an automatic one-way driving connection between the engine and the rotors.

A further object resides in the provision, in a direct lift type aircraft of the character indicated having an engine, or engines, a main rotor and means for changing the pitch of the main rotor, of means for automatically controlling the engine power as the pitch of the main rotor is changed in order to avoid stalling the engine or reducing its speed to a dangerously low value when the pitch is increased as well as preventing the engine and rotor from increasing excessively the speed of rotation when the pitch is suddenly decreased.

A still further object resides in the provision, in a direct type lift aircraft of the character indicated having an adjustable pitch, engine driven, main rotor, of means for adjusting the pitch of the main rotor and additional foot operated means for temporarily decreasing the main rotor pitch to facilitate maneuvering of the aircraft.

An additional object resides in the provision in a direct lift aircraft having an engine or engines, a main lifting rotor and one or more auxiliary lifting rotors, of means for automatically controlling the pitch of the auxiliary lifting rotors when the pitch of the main rotor is manually or automatically changed to prevent the machine from losing its normal position, the manual control of the auxiliary rotors being retained so that the position of the machine can be manually controlled during the operation of said automatic control.

Another object resides in the provision, in a direct lift aircraft having an engine or engines, a main lifting rotor and one or more auxiliary lifting rotors, of means for automatically controlling the engine power as the pitch of the main lifting rotor and the auxiliary lifting rotors is changed in order to prevent stalling the engine or reducing its speed to an undesirably low value, as well as to prevent the engine from increasing its speed to an undesirably high value.

Still another object resides in the provision in a direct lift type aircraft of the character indicated having an engine and a main rotor, of auxiliary rotors disposed in two intersecting planes to each other to provide manual control in at least two directions.

Other objects and advantages will be more particularly pointed out hereinafter or will become apparent as the description proceeds.

In the accompanying drawings, in which like reference numerals are used to designate similar parts throughout, there is illustrated, by way of example, a suitable mechanical embodiment for the purpose of disclosing the invention and two slightly modified forms of a particular part of the apparatus. The drawings, however, are for the purpose of illustration only and are not to be taken as limiting the invention as it will be apparent to those skilled in the art that various changes in the illustrated construction may be resorted to without in any way exceeding the scope of the invention.

In the drawings,

Fig. 3 is a top plan view, on a somewhat enlarged scale, of the aircraft illustrated in Fig. 1, the main supporting rotor being omitted for the purpose of clarifying the illustration.

Fig. 4 is a side-elevational view, on an enlarged scale, of the forward portion of the aircraft illustrated in Fig. 1, the rear portion of the aircraft and the landing gear being omitted.

Fig. 5 is a plan view on an enlarged scale of the means for mounting the blades of the main rotor.

Fig. 6 is an elevational view of a bracket for connecting pitch controlling members to a main rotor blade.

Fig. 7 is a partly sectioned elevational view of the main rotor blade supporting and pitch controlling means.

Fig. 8 is a plan view of the mechanism for varying the pitch of the main rotor blades.

Fig. 9 is a plan view of the auxiliary rotor and operating mechanism therefor including a portion of the automatic direct control.

Fig. 10 is a view of a fragmentary portion of the mechanism shown in Fig. 9 taken at an angle ninety degrees to the position shown in Fig. 9 and particularly illustrating the means for controlling the blade pitch of the auxiliary rotor.

Fig. 11 is a plan view of a somewhat different form of auxiliary rotor, and

Figure 1:
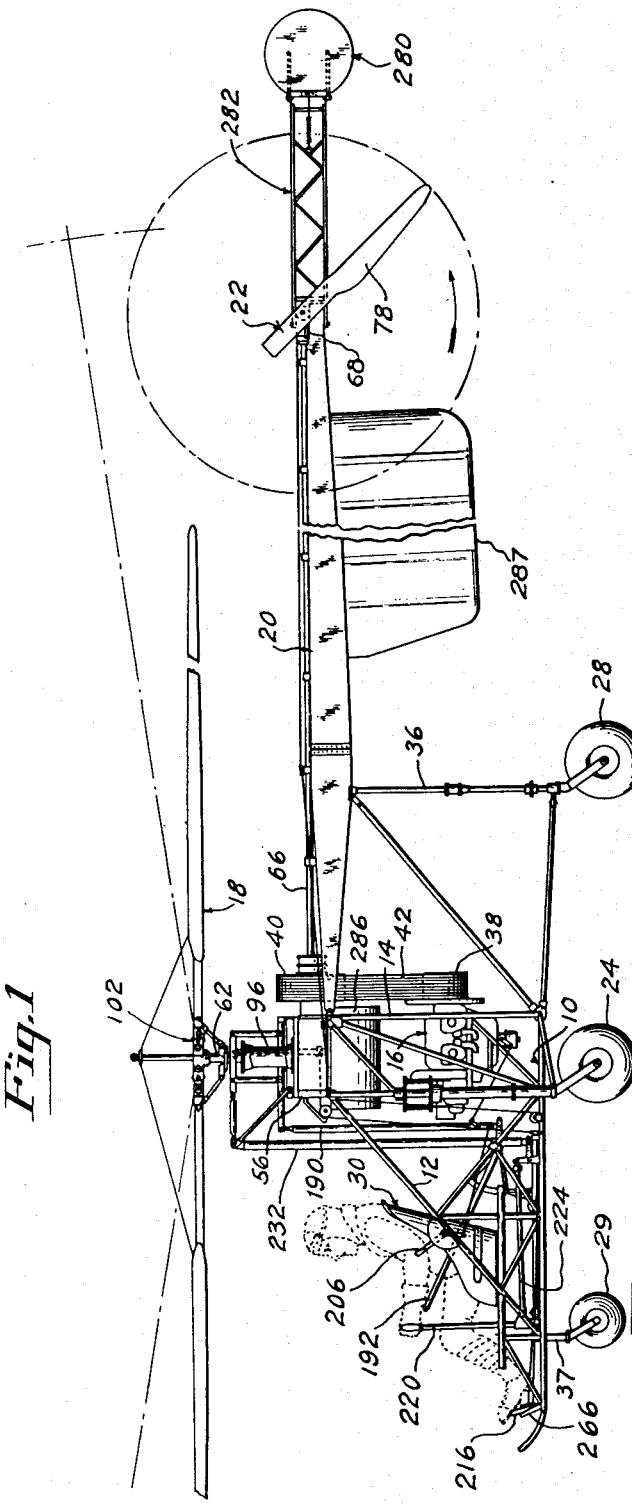
Fig. 1 is a side-elevational view of an aircraft constructed according to the invention.

Referring to the drawings in detail, and particularly to Fig. 1, the aircraft comprises a fuselage, generally indicated by the numeral 10, composed of various structural members such as the welded tubes indicated at 12 and 14, some of which will be referred to in detail later on, an engine 16, a main supporting rotor 18, a tail structure 20, a stabilizing and directional control auxiliary rotor 22, a landing gear including the wheels 24, 26 and 28, a pilot seat 30 and a number of power transmitting and control instrumentalities which will be referred to in detail as the description proceeds.

The landing gear may include the two lateral wheels 24 and 26, the rear wheel 28, and a front wheel 29, all of said wheels preferably having swivel connections with the respective shock members 32, 34, 36 and 37 which are secured to the fuselage 10 by suitable frame members.

The engine 16 is preferably mounted in the lower portion of the fuselage beneath the main rotor where its weight will be of assistance in maintaining the aircraft in proper upright position during flight and may be connected by suitable means, such as the pulleys 38 and 40 and belt drive 42, or other type of drive, with the main rotor 18 and auxiliary rotor 22.

Figure 12:
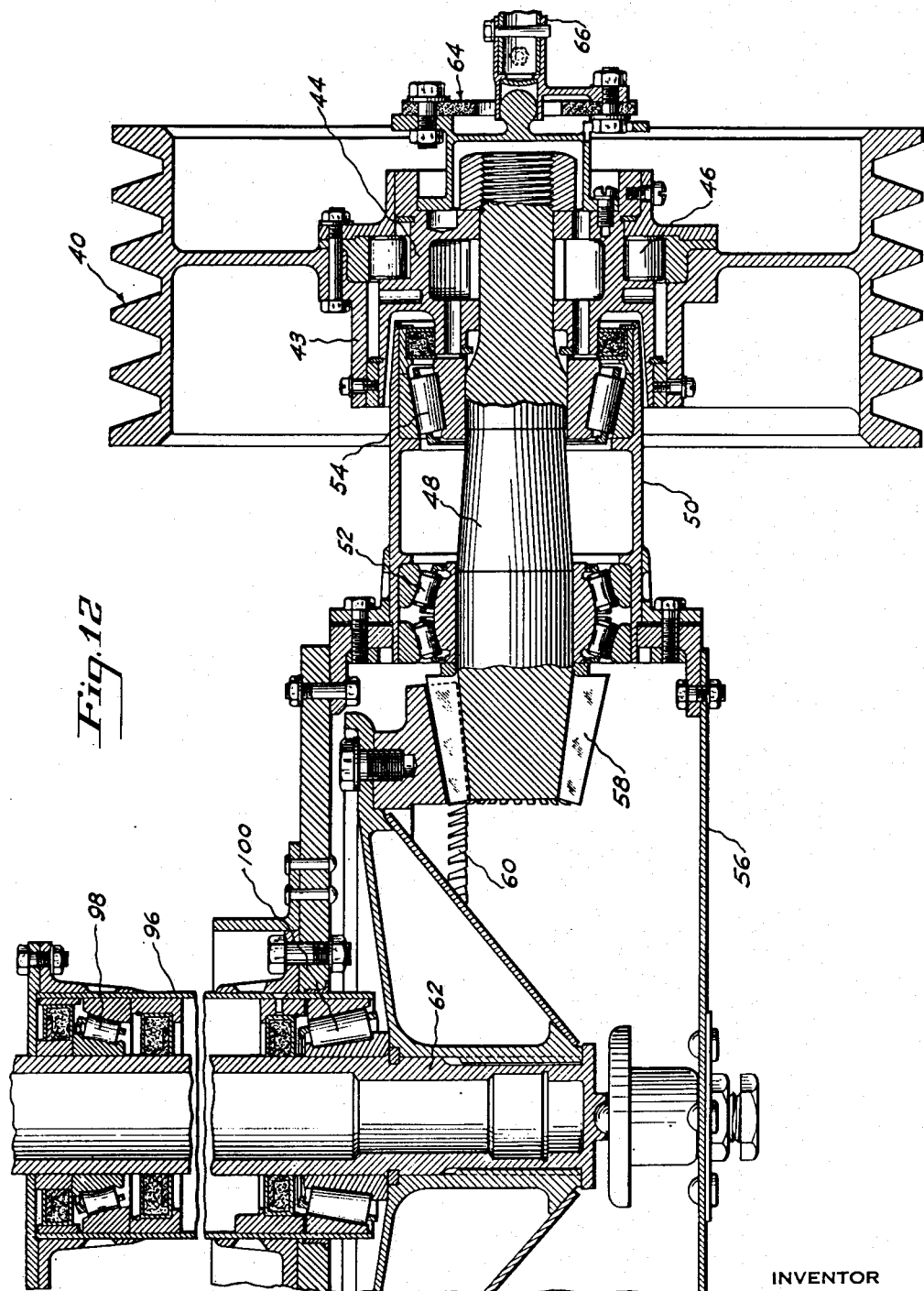
Fig. 12 is a transverse sectional view on an enlarged scale of the driving connection between the engine and the rotors and between the main rotor and auxiliary rotors.

As is particularly shown in Fig. 12, the pulley 40 has an outer portion 43 and a concentric inner portion 44 which two portions are rotatable relative to each other in one direction but are drivingly connected in the opposite direction by the one-way clutch 46. The inner portion 44 is fixed on one end of a shaft 48 which may be supported in a casing 50 by the spaced antifriction bearings 52 and 54. The end of the shaft 48 projects into a housing 56 and is provided with a beveled gear 58 which meshes with a large beveled gear 60 fixed on the lower end of a tubular shaft 62 the upper end of which is drivingly connected with the hub of the main rotor 18. The inner portion 44 of the pulley 40 is connected through suitable means, such as the flexible coupling generally indicated at 64, with a shaft 66 which extends along the tail structure 20 to a gear box 68 located near the rear end of the tail structure 20 and particularly illustrated in Figs. 9 and 10. The boom or tail structure 20 is preferably made up of structural members which give it a generally hollow construction and the shaft 66 extends through the hollow interior of the tail structure and is supported therein by suitable means such as the bearings 70.

As is particularly shown in Fig. 9, the shaft 66 is provided within the gear box 68 with a beveled gear 72 which meshes with a beveled gear 74 on the end of a hollow drive sleeve 76 which carries at its opposite end the auxiliary rotor or propeller blade 78. With this arrangement the two rotors 18 and 22 will always rotate together but both may rotate independently of the engine 16 since, if the engine speed decreases to a value below the rotor speed the one-way clutch 46 will permit the rotors to automatically overrun the engine and will drivingly connect the engine with the rotors when the engine speed equals the speed of the rotors.

As shown in Figs. 1, 3, 4 and 12 the gear casing 56 may be in the form of a parallelogram and may be rigidly secured to the fuselage 10 by suitable vertical structural members, as indicated at 14, 80, 82 and 84, which members are connected at their ends by cross members 88 and 90 and suitably braced by various diagonal members such as 92 and 94 as clearly indicated in the accompanying drawings. Since the gear case 56 is smaller than the space included between the four upright members 14, 80, 82 and 84 it may conveniently be secured to two of the upper cross members, as indicated at 88 and 90, and may be braced in position by suitable diagonal members, as indicated at 92 and 94 in Fig. 2. The above construction provides a rigid fuselage for supporting the engine 16 and the gear casing 56 in spaced relation with respect to each other and for resisting the various stresses imposed on the structure during flight.

A vertical sleeve member 96 extends upwardly from the top of the gear casing 56 and the shaft 62 is rotatably supported in this sleeve member by suitable means such as the tapered roller bearings 98 and 100 which restrain the shaft 62 against lengthwise movement relative to the sleeve 96 while permitting free rotation of the shaft.

Above the sleeve 96 the shaft 62 carries the main rotor hub generally indicated at 102 in Fig. 1 and particularly illustrated in Figs. 5 and 7. A triangular bracket member 104 is rigidly secured to the upper end of the shaft 62 and provided with pairs of apertured lugs which receive the hinge bolts 106, 108, and 110 by means of which the hinge butts 112, 114 and 116 are pivotally secured to the bracket member 104. The axes of the pins 106, 108 and 110 are substantially at right angles to the axis of the shaft 62 so that the butt plates 112, 114 and 116 may swing up and down and change their angle with respect to the axis of the shaft 62. The rotor blades, one of which is indicated at 118 in Fig. 5, are secured to the free ends of the respective plates 112, 114 and 116, by means of vertical pivots as indicated at 120, 122 and 124 so that the blades may swing relative to the hub structure in the plane of rotation of the rotor and the blades are also mounted at their inner ends in longitudinally disposed pivotal connections each comprising a stub shaft 125 connected at one end to the pivot 120 and extending through spaced radial bearings 127 and 129 and a thrust bearing 131 all secured in the blade end structure and retained in position in these bearings by a suitable abutment such as is constituted by the nuts 133 and 135 screw threaded onto the end of the stub shaft and bearing against the thrust bearing 131. These bearings are preferably anti-friction bearings and the bearings 127 and 129 may desirably be pin roller type bearings in order to provide adequate load carrying capacity and save weight and space, the construction being such that the blades may turn in pitch changing directions. This construction provides a substantially universal joint connection between each blade and the rotor hub so that the blades may swing up and down under the influence of centrifugal and aerodynamic forces and may swing in the plane of rotation of the rotor to avoid sudden movements or whipping in case there is any unevenness in the rotation of the hub. The blades are constrained to rotate with the hub by means of the flexible connections, one of which is particularly illustrated in Fig. 5 and which includes the pivoted link member 126 which slidably extends through a sleeve 128 secured intermediate its length to a bracket 130 fastened onto the trailing edge of the rotor blade 118, rubber cushions 132 and 134 being disposed between the opposite ends of the sleeve and abutments in the form of pairs of adjustable nuts 136 and 138 screw threaded onto the link 126. A bracket member 140 is pivotally secured to the leading edge of each blade by means of a vertical pivot 142 passing through aligned apertures in the projecting ends of a pair of strap members 144 and 146 (see Fig. 6) secured one to the upper and one to the lower surface of the blade adjacent the inner end thereof and projecting somewhat beyond the blades toward the respective blade carrying butt plates. Each bracket may comprise a tubular member 148 of a length slightly greater than the thickness of the rotor blades having secured to each end thereof a plate provided with an apertured extension receiving the pivot pin 142. At its side opposite the pivot 142 the bracket carries a pair of vertically spaced ball joint members 150 and 152. The upper ball joint member 152 is connected by means of a pivoted link 154 with the adjacent end of the respective pivot pin 106, 108 or 110, and the lower ball joint 150 is connected by means of a pivoted link 56 with a rotor pitch adjusting member particularly illustrated in Figs. 7 and 8 and generally indicated at 158. It is to be understood that a bracket, as indicated at 140, is pivotally connected to the leading edge portion of the inner end of each rotor blade and is in turn pivotally connected by means of links 155 and 157, similar to the link 154, with the adjacent end of the respective butt plate hinge pin and that the lower ball joints of these various bracket members are connected by the respective pivoted links 156, 159 and 160 (see Fig. 8) with angularly spaced hinge points 162, 164 and 166 on the pitch adjusting member 158.

The member 158 may comprise a flat plate 168 having an aperture 170 which surrounds the shaft 62 above the upper end of the vertical sleeve 96. Around the aperture 170 a cylindrical collar 172 is secured to the upper side of the plate 168 and carries at its upper end a ball bearing 174 the outer race of which is attached to a flat plate 176 which carries the hinge points 162, 164 and 166. This construction permits the plate 176, the hinge points 162, 164 and 166 and the link members 156, 159 and 160 to rotate with the rotor 18 and relative to the plate 168, the bearing 174 being a thrust type bearing so that pitch controlling movements of the member 158 are transmitted to the plate 176 and hence to the rotor blades through the linkage system described above. One of the links connecting the plate 176 with the rotor, for example, the link 156, may be formed as a structural member having spaced hinge points connected with the plate and a torsionally rigid construction to keep the plate 176 in a predetermined angular position relative to the rotor 18 during rotation of the rotor and the plate.

The pitch controlling member 158 is supported on a pair of vertical members 178 and 180 each of which is pivotally connected at its upper end to the underside of the plate 168 and pivotally connected at its lower end to the ends of respective arms 182 and 184 (see Fig. 4) projecting outwardly from a rotatable shaft 186 supported in suitable brackets above the gear case 56 and having at one end a third outwardly projecting arm 188 connected by a suitable link 190 with one end of a manually operable lever 192 which is pivoted intermediate its length to the framework of the fuselage 10, as indicated at 194.

It will be apparent that movements of the lever 192 will act through the intermediacy of the link 190, arm 188, shaft 186, arms 182 and 184, and links 178 and 180 to move the pitch adjusting member 158 up and down relative to the rotor hub 102. Such up and down movements of the member 158 will act through the pivoted links 156, 159 and 160 to rotate the blades about the respective stub shafts one of which is indicated at 125 in Fig. 5, the upper pivoted links 154, 155 and 157 serving as reaction members to cause the corresponding links 156, 159 and 160 to rotate the blades about the respective blade attaching stub shafts instead of about the vertical pivots 120, 122 and 124.

As is particularly shown in Fig. 4, a lever 202 is pivotally mounted intermediate its length on the lower portion of the link 190 and has one end connected with the actuating arm 204 of the engine throttle and its opposite end connected with a pivoted manually operable bell-crank lever 206 mounted on the frame adjacent to the pilot seat 30. This arrangement is such that the throttle may be manually adjusted by the lever 206 and will also be automatically adjusted by movement of the link 190 to increase the power of the engine 16 whenever the pitch of the rotor blades is increased, and to correspondingly decrease the engine power when the rotor pitch is decreased.

The manual pitch control lever 192 operates in a quadrant 208 which retains it in the position to which it is manually adjusted. This quadrant is held in position by a flexible device including a link 210 and a spring 212 and is connected by suitable means such as the flexible cable 214 with a foot pedal 216. This cable may be led over a pulley or sheave 218 to give the proper direction of pull on the quadrant 208. With this arrangement if the pedal 216 is manually depressed the pitch of the rotor 18 will be decreased and the lift of the aircraft will be diminished. This control materially facilitates landing the aircraft and maneuvering it when near the ground. When the rotor pitch is thus decreased the lever 202 will be moved to simultaneously decrease the engine power to avoid overrevving of the engine and rotor and insure a substantial decrease in the lift of the aircraft.

In order to obtain satisfactory control in flight it may be desirable to periodically vary the lift of the main rotor both fore and aft and laterally. Thus, in order to obtain the proper pitching control, the main rotor lift may be decreased forwardly and increased rearwardly or vice versa and to obtain lateral control the lift may be increased on one side and decreased on the other and this variation in lift may be reversed from one side to the other as may be necessary in order to maintain the aircraft in proper equilibrium. This variable or periodic change in rotor lift may be obtained by moving the pitch control member 158 laterally relative to the shaft 62 and proper instrumentalities are provided to give to this pitch control member both a fore and aft movement and a lateral movement as will presently appear. A manual control column 220 is mounted on a shaft 222 near one end thereof in such a manner that the control column may pivot forwardly and rearwardly relative to the longitudinally disposed shaft but when moved laterally will rotate the shaft 222. A link 224 substantially parallel to the shaft 222 is pivoted to the control column 220 at a point 226 spaced from the control column pivot 228 and is pivotally connected at its end opposite the control column to one leg of a pivoted bell-crank lever 230 the other leg of which is pivotally connected to a vertical link 232 the upper end of which is pivotally connected to the apex of a triangle including the link members 234 and 236 of which the member 236 is pivotally connected at its opposite end to the gear case 56 and the member 234 is pivotally connected at its opposite end to the forward side of the pitch changing member 158. The manual control column 220 in moving fore and aft will move the link 232 up and down swinging the link 236 about its pivotal connection with the fixed gear case 56 and thereby moving the link 234 and the pitch control member 158 in a fore and aft direction. When the member 158 is moved forwardly the plate 176 will also be moved forwardly thereby pushing up on the pivoted links 156, 159 and 160 as these links reach their forward position and pulling downwardly on the links as they reach their rearward position. This action will increase the rotor lift at the front and decrease the lift at the rear of the rotor and tend to force the nose of the aircraft upwardly as would be expected from a rearward movement of the control column. A forward movement of the control column would correspondingly increase the lift at the rear of the rotor and decrease the lift at the front thereby forcing the nose of the aircraft down in the conventional manner.

The shaft 222 carries at its rear end a cross lever 238 the opposite ends of which are connected by the cables 240 and 242 with the opposite ends of a cross lever 244 fixed on the lower end of a shaft 246 (see Fig. 2) which is pivotally mounted on the gear case 56 by suitable means, such as the brackets one of which is indicated at 248, the cables being led over suitable pulleys or sheaves 250 and 252 (see Fig. 3), to give the proper direction of pull on the lever 244. At its upper end the shaft 246 carries a lever arm 254 the free end of which is connected by means of a suitable link 256 with the adjacent side of the pitch control member 158. With the above described arrangement, movement of the control column 220 from side to side will rotate the shafts 222 and 246 and thereby move the pitch control member 158 to change the lift of the main rotor from one side of the aircraft to the other to control the rolling movements of the aircraft.

As mentioned above, the directional movements of the aircraft are controlled by the auxiliary rotor 22 the control being obtained by changing or reversing the pitch of the blade 258 of the auxiliary rotor. For this purpose a pair of cables 260 and 262 may be connected to the foot pedals 264 and 266 respectively and to the opposite ends of a lever bar 268 pivotally mounted intermediate its length on the gear box 68 in such a manner that movement of the pedals 264 and 266 will swing the lever bar 268 about its pivotal connection. A lever arm 270 movable with the bar 268 projects rearwardly therefrom and is connected by means of a link 272 with the projecting end of a rod 274 which extends through the hollow rotor drive sleeve 76 and through the rotor and has its projecting end connected by means of a pivoted link 276 with a bracket 278 secured to the leading edge of the rotor blade 258 in such a manner that lengthwise movement of the rod 274 will turn the blade 258 about its longitudinal axis to change the pitch of the blade the blade being pivotally connected intermediate its width to the drive shaft by a trunnion as indicated at 259. With this arrangement the pilot can control the direction in which the aircraft is pointed by moving the foot pedals 264 and 266 to vary the pitch of the secondary rotor blade 78, the thrust of this blade being applied to the tail structure 20 in a manner to swing the aircraft about the rotational axis of the main rotor. In order to obtain automatic directional stability the vane 280 disposed rearwardly of the rotor 22 may be connected to the arm 270 by a suitable support in the form of a tubular member 282 which support may also be connected to an arm 283 pivoted on the opposite side of the gear box from the arm 270 and connected with the end of the rod 274 by a link 285 substantially parallel to the link 272. This arrangement is such that any lateral air force acting on one side or the other of vane 280 will move the vane sideways and swing the member 282 and arm 270 to move the shaft 274 and change the pitch of the rotor blade 78. If desired, the vane 280 may be connected to the member 282 by means of an adjustable connection, generally indicated at 284, so arranged that the vane may be set at the proper angle to compensate the torque of the main rotor and the air whirl caused by operation of the main rotor.

Additional directional control and damping of the movements of the aircraft about the axis of the main rotor may be provided by increasing the vertical dimension of the tail structure or by attaching to the tail structure a fixed vertical fin as indicated at 287 in Fig. 1.

Figure 2:
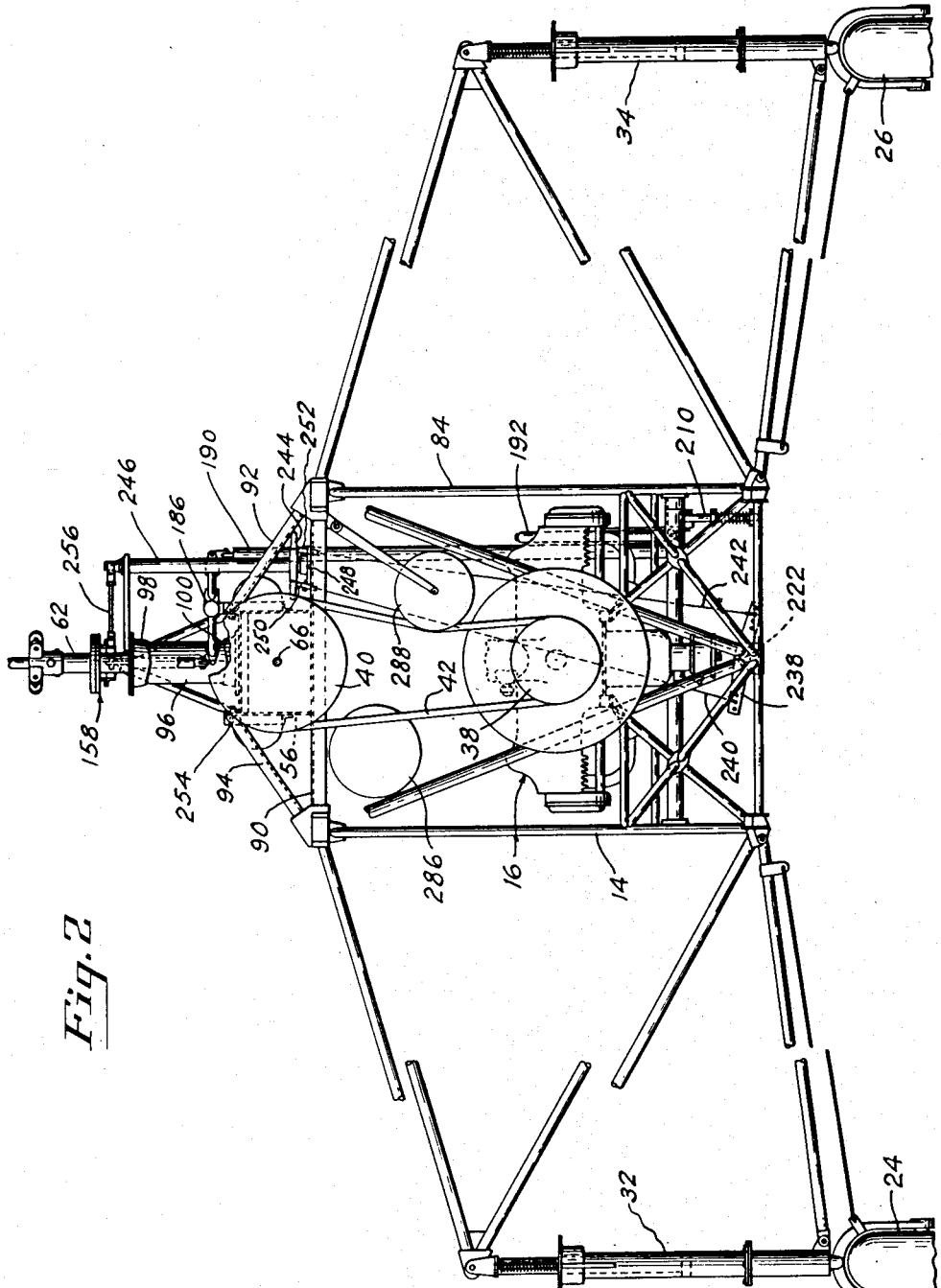
Fig. 2 is a rear-elevational view of the aircraft illustrated in Fig. 1 on a somewhat enlarged scale, the rear propeller and support therefor being omitted for purposes of clarifying the illustration.

If desired the aircraft may be equipped with a fuel tank 286 as particularly shown in Fig. 2, an oil tank, not illustrated, an idler pulley 288 for tightening the belt 42 and other equipment as may be necessary or desired, the essential operating and control features only having been particularly illustrated in the drawings and hereinabove described.

In the arrangement shown in Fig. 11, the shaft 66 is connected by a universal connection 324 with a stub shaft 326 which projects into one portion 328 of a two part gear box generally indicated at 330 which is the equivalent of the gear box 68 shown in Figs. 3 and 9. The stub shaft is supported in the gear box by the spaced anti-friction bearings 332 and 334 which may conveniently be retained in operative position by the screw caps 336 and 338, and carries the bevel gear 72 which meshes with the gear 74 of Fig. 9 on the inner end of the drive shaft 76 of the rotor 22. Otherwise the construction of the rotor 22 and its control is the same as that illustrated in Fig. 9 and described above. The gear 74 also meshes with a beveled gear 340 on the inner end of a vertically disposed drive shaft 342 which carries on its upper end a rotor blade 344. The drive shaft 342 is supported in anti-friction bearings 346 and 348 in a second portion 350 of the gear box 330, these bearings being held in operative position by suitable means such as the spacer 352 and gland nut 354 which also compresses a packing seal 356 about the shaft 342 where it projects from the gear box. The part 350 of the gear box is so disposed relative to the part 328 that the shaft 342 inclines somewhat forwardly relative to the shaft 326 in order that the gear 340, while meshing with the gear 74, will clear the gear 72. The pitch of the horizontal rotor blade 344 carried by the vertical shaft 342 may be controlled by suitable means such as the sleeve 358 slidable on the shaft 342 between the gear box and the rotor blade pivotally connected to the leading edge of the blade by suitable means including the pivoted link 360 and provided with an annular groove 362 which receives the points of a yoke member 364 pivotally mounted on a bracket 366 and having connected thereto a control link 368.

With this arrangement the rotor blade 78 provides directional control for the aircraft, as described above, and the rotor blades 344 provides pitching control either exclusively or in addition to the pitching control provided by the main rotor and also serves to provide a portion of the lift necessary to support the aircraft in the air. The blades are so disposed that, while the rotational planes of the two blades intersect substantially at right angles, the blades pass through the location of intersection of the two planes at different times and there is, therefore, no interference between the blade during operation.

While a particular mechanical embodiment and two somewhat modified details thereof have been hereinabove described and illustrated in the accompanying drawings for the purpose of disclosing the invention, it is to be understood that the invention is not limited to the particular construction so illustrated and described but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In an aircraft having a direct lift rotor and an engine for driving said rotor, manually actuatable means permanently connected with said rotor for varying the pitch of said rotor, and means positively and permanently connected with said manually actuatable means and with said motor for simultaneously and positively varying the rotor pitch and the power output of said engine upon each movement of said manually actuatable means.

2. In an aircraft having a direct lift main rotor and an auxiliary rotor having a plane of rotation at right angles to the plane of rotation of said main rotor, an auxiliary rotor blade mounted for pitch changing movements, means for changing the pitch of said blade, and means responsive to positional changes of said aircraft operatively connected with said pitch changing means for controlling the pitch of said auxiliary rotor to maintain the position of said aircraft substantially constant.

3. In an aircraft having a direct lift main rotor and an auxiliary rotor for directional control, means for changing the pitch of said auxiliary rotor, and a vane responsive to movements of said aircraft about the axis of said main rotor for automatically controlling the pitch of said auxiliary rotor to control rotational movements of said aircraft about said axis.

4. In an aircraft having a direct lift main rotor and an auxiliary rotor for changing the position of said aircraft about the axis of said main rotor, means for varying the effect of said auxiliary rotor by changing the pitch thereof, operator actuated means for controlling said pitch changing means, and means responsive to movements of said aircraft about the axis of said main rotor for controlling the pitch of said auxiliary rotor to minimize such movements.

5. In an aircraft having a main sustaining rotor including a plurality of airfoil blades, and a rotor supporting drive shaft, a universal connection between the inner end of each blade and said shaft, a pivotal connection between each blade and said shaft providing freedom of pitch changing movements of said blades about their longitudinal axes, a bracket pivotally connected to the inner end of each blade on an axis perpendicular to said longitudinal axis, a pitch control member surrounding said shaft at a location spaced from said universal connections, a pair of rigid links pivotally connected to each bracket at locations spaced apart in the direction of the thickness of said blade and spaced from the major axis thereof, a pivotal connection between one of said links and said shaft, and a pivotal connection between the other of said links and said control member.

6. The arrangement as set forth in claim 5 in which the pivotal connection between one of said links and said control member is a torque transmitting connection operative to constrain a portion of said control member to rotate with said rotor.

7. The arrangement as set forth in claim 5 including resilient torque transmitting links pivotally secured to said blades and said shaft to constrain said blades to rotate with said shaft while permitting a limited freedom of resiliently resisted movement in the plane of rotation about said universal joints.

8. In an aircraft having a direct lift main rotor, a combination of two auxiliary rotors arranged so closely to each other as to intersect the plane of rotation of each other, spaced from said main rotor and each having one or more blades, the rotors in said combination being disposed approximately at right angles to each other, one of said auxiliary rotors being effective to control turning movement of said aircraft about the axis of the main rotor and the other being effective to change the plane of rotation of said main rotor, means for driving said combination of auxiliary rotors from said main rotor, means for independently changing the pitch of each of said auxiliary rotor blades, and operator actuated means for controlling said pitch changing means.

9. In an aircraft having a direct lift rotor and an engine for driving said rotor, means connected with said rotor for varying the pitch thereof, a throttle for said engine, and mechanism positively and permanently connecting said throttle with said means, said mechanism including means for selectively setting the throttle at will and means actuated by each pitch changing movement of said pitch varying means, for simultaneously, positively, varying said selected throttle setting.

10. In an aircraft having a direct lift rotor and an engine for driving said rotor, means connected with said rotor for varying the pitch thereof, a throttle control for said engine, means for setting said throttle at any desired position, means positively and permanently connecting said throttle control with said pitch varying means for simultaneously and positively varying the rotor pitch and the power output of said engine upon each movement of said pitch varying means.

IGOR I. SIKORSKY.